UNITED STATES PATENT OFFICE.

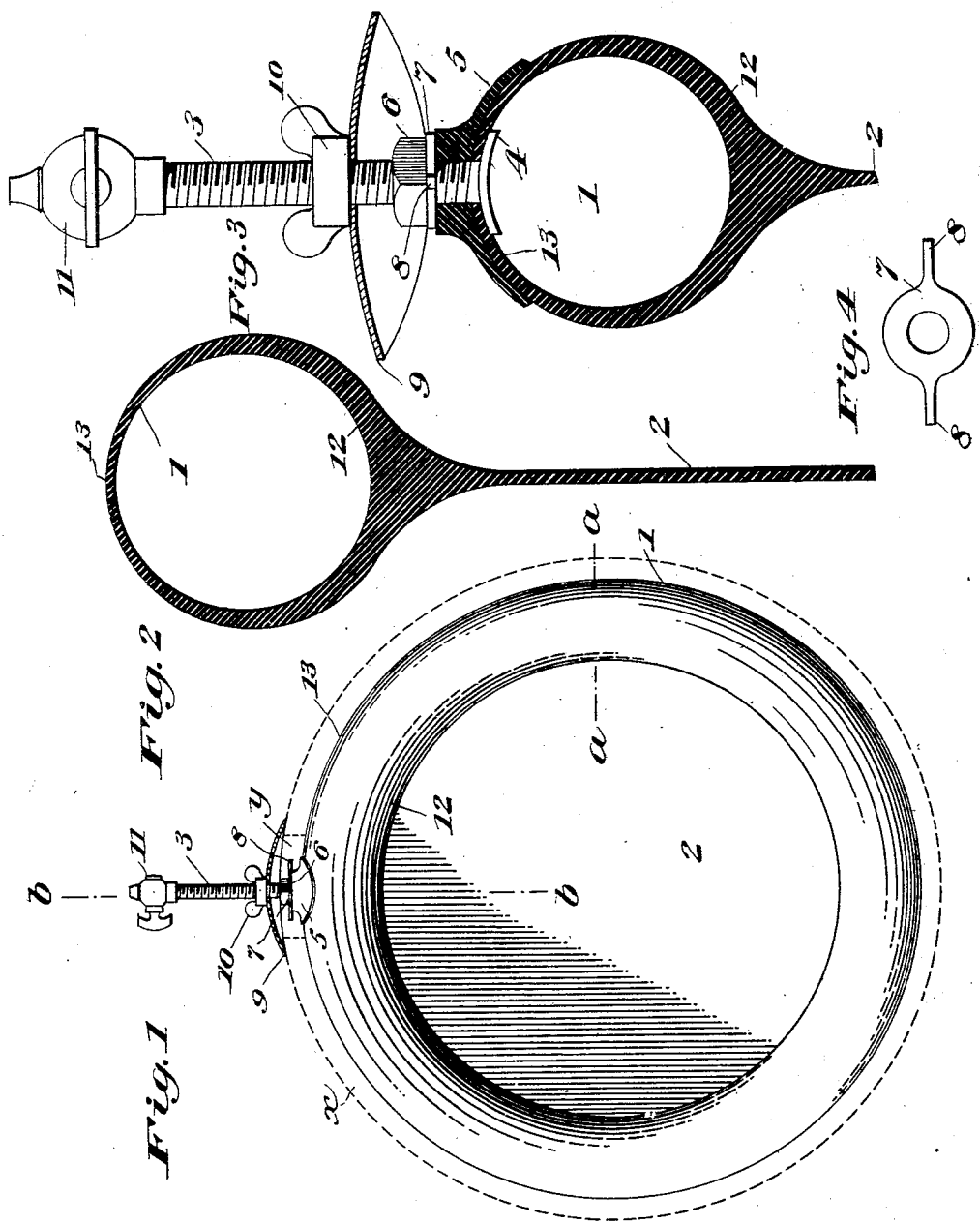

JOHN FRANKLIN, OF NORWOOD, OHIO.

STOPPER FOR GAS-MAINS.

SPECIFICATION forming part of Letters Patent No. 702,937, dated June 24, 1902.

Application filed February 15, 1902. Serial No. 94,263. (No model.)

*To all whom it may concern:*

Be it known that I, JOHN FRANKLIN, a citizen of the United States of America, and a resident of Norwood, in the county of Hamilton and State of Ohio, have invented certain new and useful Improvements in Stoppers for Gas-Mains and the Like, of which the following is a specification.

This invention relates to certain improvements in stoppers such as are adapted for use in stopping or plugging gas-mains during repairs and while connections are being made; and the object of the invention is to provide a device of this general character of a simple and inexpensive nature and of a construction adapted to afford greater efficiency and convenience of use, together with increased durability of the device itself.

The invention consists in a stopper comprising a flexible diaphragm constructed from material impervious to the passage of gases and adapted to be extended across the interior of the main to be stopped or plugged and a device extended around the edge portions of said diaphragm and connected thereto by an impervious joint and adapted for actuation to press frictionally upon the walls of the main for holding the diaphragm in position to stop the flow of gas through the main.

The invention also contemplates certain novel features of the construction, combination, and arrangement of the various parts of the improved stopper, whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate my invention, Figure 1 is an elevation of a stopper embodying my improvements, the outline of a gas-main tapped with an opening for the insertion of the stopper being shown in dotted lines to illustrate the application of the device within the main. Fig. 2 is an enlarged partial section taken through the edge portion of the improved stopper in the plane indicated by the line $a\,a$ in Fig. 1 and showing the construction of the marginal device for holding the diaphragm stretched across the main. Fig. 3 is an enlarged partial section taken through the edge portion of the improved stopper at the inflating stem and in the plane indicated by the line $b\,b$ in Fig. 1. Fig. 4 is an enlarged detail view showing the index device for ascertaining the position of the device within the main.

As shown in the views, the improved stopper comprises an annular marginal portion or ring 1, formed with an interior hollow extended entirely around it, and a membrane-like diaphragm 2, extended across the circular space within said marginal portion or ring, both of these parts being formed by preference from soft rubber or other elastic material impervious to gases and when so formed from rubber being vulcanized together to render them integral and to produce a gas-tight connection or joint between the two parts of the device.

The marginal portion or ring 1 of the device is constructed somewhat after the fashion of an ordinary pneumatic tire and is adapted to be inflated by means of air forced within its hollow, for which purpose said marginal portion or ring is provided at one point in its circumference with an inflation tube or nipple 3, preferably formed from metal tubing, exteriorly screw-threaded and provided with a head or enlargement at one end, as seen at 4 in Fig. 3, said head or enlargement being located within the hollow of said marginal portion or ring, which latter is provided with an opening, through which the tube or nipple 3 is passed outwardly, as clearly shown in said figure. Outside of said marginal portion or ring 1 the tube or nipple 3 carries on it a gasket 5, preferably formed from soft rubber with its inner or under surface concaved to fit the convex outer surface of the ring 1, the tube or nipple 3 having outside of said gasket a nut 6, by means of which the gasket may be pressed tightly down upon the outer face of said ring portion 1 to securely clamp the edges of the opening, through which the tube or nipple 3 is passed and prevent the escape or leakage of air around the said tube or nipple. On the tube or nipple 3 and between the nut 6 and the gasket 5 is held an index device, formed of a perforated body portion 7, through which the tube 3 is passed, and oppositely-directed arms 8, arranged to project across the upper surface of the gasket on opposite sides of the nut and in the direction of the circumference of the ring portion 1, these arms serving to indicate the position in which the device stands when it is inserted for use within a gas-main. After the tube 3 and its gasket and nut, together with the said index device, are assembled the device is vulcanized, so as to securely bind the several parts together to prevent leakage or loosening of the nut and index. The tube or nipple 3 also carries loosely upon it a centrally-perforated cap or cover-plate 9 of circular form and of a diameter sufficient to cover up and close the opening in the main through which the improved stopper is inserted for use, and above said cap or cover-plate is another nut 10, having threaded engagement with said tube for pressing said cap or cover-plate securely and tightly down upon the outer surface of the main when the improved stopper is in position within the main for use. On the extremity of the tube or nipple 3 is also carried a cock or valve 11, by means of which the flow of air through the passage of said tube for the inflation or deflation of the hollow ring portion 1 may be controlled at will. The construction of this cock or valve forms no part of and is immaterial to my present invention.

At the inner surface of the hollow ring portion 1 of the improved stopper or at the side of such portion where connection is made with the membrane-like diaphragm 2 the walls of such portion 1 are thickened and strengthened, as shown at 12, so as to render them much less easy of distention than the outer walls of said portion 1, which outer walls, as shown at 13, are made quite thin relatively to said thickened portions 12, so that they may be more readily distended by the air forced within the hollow of ring 1 to cause them to be forced tightly against the walls of the main to form a tight joint between them and said walls to prevent passage of gas and also to securely hold the improved stopper in position with its membrane-like diaphragm stretched across the hollow of the main. Owing to the thickened inner portions of the ring 1 it will be evident that substantially all of the distention of said portion when inflated will be in an outward direction, said thickened portions 12 resisting distention, so that when the device is inflated it will be securely held within the main by the outward distention of its thinner outer walls.

In using the improved stopper the device in deflated condition is first inserted within the tapped opening $y$ of the main $x$ and when so inserted is adjusted so that the membrane-like diaphragm 2 will stand in position to close the hollow of the main when the device is inflated, such adjustment being facilitated by observing the index device, which indicates the position of the stopper when in the main. After the stopper is in position in the main the cap or cover plate 9 is forced tightly down upon the outer side of the main and is secured in place by means of the nut 10 above it. The cock or valve 11 is then opened, and air is forced through the tube or nipple 3 to inflate the hollow rim or ring portion 1 of the stopper, the thin outer wall 13 being distended by such inflation and tightly pressed against the walls of the main to form a gas-tight joint therewith and prevent movement of the stopper from its position by the pressure of the gas within the main.

The device constructed as above described is of an extremely simple and inexpensive nature and is especially well adapted for use, since it is light and durable and is so compact in structure as to be very readily inserted within the tapped opening of the main and is therefore not liable to be cut or torn when so inserted. The device is also of such a nature as to permit of its being readily repaired in case it should be torn or injured, and by its use a saving of time may be effected, since much less air is required for its inflation than is required in other pneumatic devices such as have been hitherto employed for this purpose. It will also be obvious from the above description that the improved stopper constructed according to my invention is capable of some modification without material departure from the principles and spirit of the invention, and for this reason I do not wish to be understood as limiting myself to the precise form and arrangement of the device as herein set forth.

Having thus described my invention, what I claim, and desire to secure by Letters Patent, is—

1. A stopper for gas-mains and the like comprising a flexible diaphragm of impervious material adapted to be extended across the interior of the main and a rim portion integral with said flexible diaphragm and inflatable and deflatable and provided with means for inflating it and when so inflated being adapted to press frictionally upon the walls of the main to hold the diaphragm in position in the main, the diaphragm and rim portion being both adapted for flexure to permit ready introduction of the device through an opening in the wall of a main, substantially as set forth.

2. A stopper for gas-mains and the like comprising a flexible diaphragm of impervious material adapted to be extended across the interior of the main and a hollow inflatable marginal portion extended around the edges of said diaphragm and adapted when inflated, to press frictionally against the walls of the main to hold the diaphragm in position within the same, the inner walls of said hollow marginal portion being thickened with respect to the outer walls thereof, whereby, when said portion is inflated, its distention is outward, substantially as set forth.

3. A stopper for gas-mains and the like comprising a flexible diaphragm adapted to be extended across the interior of the main, a hollow inflatable marginal portion for said diaphragm adapted when inflated to press frictionally upon the walls of the main to hold the diaphragm in position within the main, a screw-threaded inflation-tube connected with said marginal portion, and an index device having a perforation through which the inflation-tube is passed and adapted to indicate the position of the stopper when in a main, and a nut screwed on said inflation-tube and between which and the marginal portion the index device is held, substantially as set forth.

Signed at Cincinnati, Ohio, this 8th day of February, 1902.

JOHN FRANKLIN.

Witnesses:
JOHN ELIAS JONES,
L. M. JONES.